United States Patent
Ito et al.

(10) Patent No.: US 7,241,335 B2
(45) Date of Patent: Jul. 10, 2007

(54) AQUEOUS INK FOR BALL POINT PENS

(75) Inventors: Atsushi Ito, Osaka (JP); Naoshi Murata, Osaka (JP); Yumi Hirose, Ikoma (JP)

(73) Assignee: Sakura Color Products Corporation, Osaka-shi (JP)

( * ) Notice: Subject to any disclaimer, the term of this patent is extended or adjusted under 35 U.S.C. 154(b) by 0 days.

(21) Appl. No.: 10/973,190

(22) Filed: Oct. 25, 2004

(65) Prior Publication Data

US 2005/0166795 A1      Aug. 4, 2005

Related U.S. Application Data

(63) Continuation-in-part of application No. PCT/JP03/05083, filed on Apr. 22, 2003.

(30) Foreign Application Priority Data

Apr. 25, 2002   (JP) ............................. 2002-123580

(51) Int. Cl.
     *C09D 11/00*   (2006.01)
(52) U.S. Cl. ................. 106/31.86; 106/31.58
(58) Field of Classification Search ............ 106/31.86, 106/31.58
     See application file for complete search history.

(56) References Cited

U.S. PATENT DOCUMENTS

| | | | | |
|---|---|---|---|---|
| 5,658,376 A | * | 8/1997 | Noguchi et al. ......... | 106/31.43 |
| 5,741,354 A | * | 4/1998 | Kawasumi et al. ...... | 106/31.85 |
| 6,114,412 A | * | 9/2000 | Kanbayashi et al. ........ | 523/161 |
| 6,146,452 A | * | 11/2000 | Takeuchi ................. | 106/31.58 |
| 6,176,910 B1 | * | 1/2001 | Miyazaki et al. ......... | 106/31.36 |
| 6,613,135 B1 | * | 9/2003 | Miyamoto et al. ....... | 106/31.35 |
| 6,770,689 B1 | * | 8/2004 | Yoshimura et al. ......... | 523/161 |
| 2004/0173121 A1 | * | 9/2004 | Fukuo et al. ............. | 106/31.89 |
| 2005/0143486 A1 | * | 6/2005 | Yoshimura et al. ......... | 523/160 |
| 2005/0148685 A1 | * | 7/2005 | Yamamoto .................. | 523/160 |

FOREIGN PATENT DOCUMENTS

| | | | |
|---|---|---|---|
| EP | 1462495 A1 | * | 9/2004 |
| JP | 10279876 A | * | 10/1998 |
| JP | 2002-60666 | | 2/2002 |
| JP | 2004067769 A | * | 3/2004 |

* cited by examiner

*Primary Examiner*—J. A. Lorengo
*Assistant Examiner*—Veronica Faison-Gee
(74) *Attorney, Agent, or Firm*—Hamre, Schumann, Mueller & Larson, PC

(57) ABSTRACT

The invention provides an aqueous ink composition for ball-point pens excellent in both the lubricity for an aqueous ballpoint pen tip and the bleed resistance of writing. The ink composition comprises water and a colorant as the essential components and is characterized by further containing a compound represented by the general formula (1) and at least one water-soluble organic solvent selected from among alcohols having branched hydrophobic groups, glycols, and glycol ethers General formula (1)

$$R_2-O-(CH_2CH_2O)n-\underset{\underset{O}{\|}}{P}\begin{matrix}R_1\\OX\end{matrix}$$

11 Claims, No Drawings

AQUEOUS INK FOR BALL POINT PENS

This application is a Continuation-In-Part of PCT/JP03/05083, filed Apr. 22, 2003, which application is incorporated herein by reference.

PRIOR ART

The present invention relates to an aqueous ink composition for ball-point pens. In more detail, the present invention relates to an aqueous ink composition for ball-point pens which does not cause flaws such as bleeding of a written mark and discontinued lines at a time of writing and the like.

Conventionally, various kinds of aqueous inks for ball-point pens comprising colorants and water and further compounding various compounds in order to enhance lubricity which makes rolling of a ball at a ball-point pen tip smooth are publicly known. For example, in order to enhance said lubricity, trials have been made which include adding alkaline metal salt or amine salt of an anionic surfactants having alkaline metal salt or carboxylic group of unsaturated aliphatic acid.

However, it has been difficult for said conventional lubricants to achieve both lubricity and other writing characteristics at the same time, and although satisfactory lubricity was obtained by adding great amount of lubricants, on the other hand, due to great amount of lubricants, problems arose that is, surface tension of an ink was greatly reduced and a written mark was liable to bleed and an ink leaked from a container for writing instruments, and the like. Further, depending on selected pigments and resins, it was observed in many cases that satisfactory lubricity could not be obtained even though lubricants were used.

The object of the present invention is to provide an aqueous ink composition for ball-point pens comprising a colorant and water, which at least does not cause flaws such as bleeding of a written mark and discontinued lines at a time of writing while maintaining lubricity of a ball-point pen tip.

DISCLOSURE OF THE INVENTION

As a result of intensive study to solve these problems, the present inventors found that an ink comprising water and a colorant as essential ingredients and characterized by further comprising a compound represented by the following general formula (1) and at least one water-soluble organic solvent selected from among alcohols having branched hydrophobic groups, glycols, and glycol ethers is capable of maintaining lubricity and smooth writing performance when compared with an aqueous ink comprising compound alone represented by the following general formula (1) and moreover, that the bleeding of a written mark and discontinued lines at a time of writing are not generated.

General formula (1)

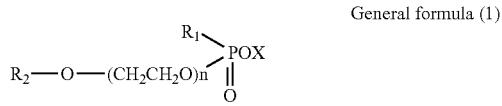

($R_1$-is either —OX or $R_2$—O—$(CH_2CH_2O)_n$—, $R_2$-is alkyl group or alkenyl group or alkyl phenyl group of $C_8$ to $C_{18}$, n is 1 to 30, X is alkali metal or amine or alkanol amine)

BEST MODE FOR CARRYING OUT THE INVENTION (Compound Represented by Formula (1))

The compound represented by the following general formula (1) which is used in the present invention is employed for the purpose of improving the lubricity of a ball-point pen tip and although the function is not certain, said compound seems to improve the lubricity by forming a thin film on a gap between a metallic tip ball seat and a ball.

General formula (1)

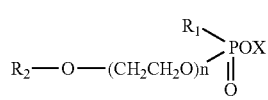

($R_1$-is either —OX or $R_2$—O—$(CH_2CH_2O)_n$—, $R_2$-is alkyl group or alkenyl group or alkyl phenyl group of $C_8$ to $C_{18}$, n is 1 to 30, X is alkali metal or amine or alkanol amine).

To be specific, alkali metal salt of phosphoric acid monoester of polyoxyethylene alkyl ether, alkali metal salt of phosphoric acid monoester of polyoxyethylene alkyl phenyl ether, alkali metal salt of phosphoric acid diester of polyoxyethylene alkyl ether, alkali metal salt of phosphoric acid diester of polyoxyethylene alkyl phenyl ether are exemplified. Here, as alkali metals, sodium and potassium are exemplified. Further, amine salt of phosphoric acid monoester of polyoxyethylene alkyl ether, amine salt of phosphoric acid monoester of polyoxyethylene alkyl phenyl ether, amine salt of phosphoric acid diester of polyoxyethylene alkyl ether, amine salt of phosphoric acid diester of polyoxyethylene alkyl phenyl ether are exemplified.

In addition, alkanol amine salt of phosphoric acid monoester of polyoxyethylene alkyl ether, alkanol amine salt of phosphoric acid monoester of polyoxyethylene alkyl phenyl ether, alkanol amine salt of phosphoric acid diester of polyoxyethylene alkyl ether, alkanol amine salt of phosphoric acid diester of polyoxyethylene alkyl phenyl ether are exemplified.

Examples include "PHOSPHANOL PE-510", "PHOSPHANOL ML-220", "PHOSPHANOL RA-600", and "PHOSPHANOL RE-610" manufactured by TOHO Chemical Industry Co., Ltd and "PLYSURF A 212 E", "PLYSURF A 215 C", and "PLYSURF A 210 G" manufactured by DAIICHI KOGYO SEIYAKU CO., LTD and the like. Further, one species of them can be used or two or more of them can be used in a mixture. Among them, "PHOSPHANOL ML-220" can preferably be used.

It is preferable that the content amount of the compound represented by the following formula (1) which is used in the present invention is 0.05 to 10% by weight with respect to the total amount of the ink composition. When the content amount of the compound represented by the following formula (1) is less than 0.05% by weight with respect to the total amount of the ink composition, since lubricating effect is not enough, smooth writing is impossible and disconnecting lines appear. When the content amount exceeds 10% by weight, since the viscosity becomes too much, writing aptitude lowers and also bleeding of a written mark generates since surface tension value of the ink lowers.

From the view point of inhibiting bleeding of a written mark, the content amount of the compound represented by the general formula (1) is preferably 0.1 to 5.0% by weight and the optimum content amount is 0.2 to 2.0% by weight.

(Colorant)

Any colorant may be used as long as it has an effect of optionally coloring inks and pigments and dyes which can usually be used for ball-point pens can be used. In view of the effect of the present invention, pigments are preferably used and as pigments, known various kinds of pigments are applicable and examples include organic pigments such as azo type pigments, condensation poly azo type pigments, phthalocyanine type pigments, quinacridone type pigments, anthlaquinone type pigments, dioxisazine type pigments, indigo type pigments, indigo type pigments, thio indigo type pigments, perynon, perylene type pigments, melamine type pigments, and the like, inorganic pigments such as titanium oxide, iron oxide, carbon black, and the like, metallic powder pigments such as aluminum pigments and the like, and a resin emulsion colored matter in which water dispersion of polymer fine particles with an average particle diameter of 0.1 to 1 μm obtained by emulsion polymerization using styrene resin, acrylic resin, and acrylonitryl resin alone or in combinations of two or more of them is colored with base dyes, fluorescent base dyes and/or brightening agent, and the like. In addition, scaly glittering particles (such as metal reflection surface and the like) having smoothness on a particle surface (for example, glass flakes, inorganic particles, resin film pieces, and the like) can be used. These may be used alone or in combinations of two or more of them.

In one aspect, the ink composition of the present invention does not use dyes and metal powder pigments in combinations as colorants. In particular, the present composition can preferably contain organic pigments such as azo type pigments, condensation poly azo type pigments, phthalocyanine type pigments, quinacridone type pigments, anthlaquinone type pigments, dioxisazine type pigments, indigo type pigments, indigo type pigments, thio indigo type pigments, perynon, perylene type pigments, melamine type pigments, and the like, inorganic pigments such as titanium oxide, iron oxide, carbon black, and the like, and pigments selected from the group composed of said resin emulsion colored matters and said glittering particles, and other pigments cannot be contained.

The content amount of these colorants is preferably 1 to 30% by weight and more preferably within the range of 3 to 15% by weight. When the used amount of these is small, a written mark becomes thin and when the used amount of these is large, viscosity becomes high and writing deteriorates.

(Pigment Dispersant)

As pigment dispersant, at least one species is selected from among commonly used water soluble resins, surfactants, and the like, and regarding water soluble resins, any one of natural products, semisynthetic products, and synthetics can be used, however, from the view point of problems of molds and septic action, and also from the viewpoint of viscosity property, synthetic products are most suitable. As synthetic products such as these, for example, water soluble acryl resins, water soluble maleic acid resins, water soluble styrene resins, water soluble styrene acryl resins, water soluble styrenemaleic acid resins, polyvinyl pyrrolidone, polyvinyl alcohol, water soluble urethane resins, and the like are exemplified. Further, surfactants are used, optionally selected from among those with anionic property, cation property, nonionic property, and ampholytic property. The used amount of said pigment dispersant is selected within the range of 0.05 to 2 parts by weight with respect to 1 part by weight of a pigment. When the used amount of these is small, dispersal stability of pigments deteriorates and when the used amount of these is large, viscosity becomes high and writing deteriorates.

(Water-Soluble Organic Solvent)

As water-soluble organic solvent, at least one species of alcohols, glycols, and glycol ethers having a branched hydrophobic group is used. The structure of "having a branched hydrophobic group" in a water-soluble organic solvent of the present invention means the structure in which a hydrophobic group is bound to a principal chain as a side chain in a chain compound. Species of a hydrophobic group may any of methyl group, ethyl group, and the like. There may be one hydrophobic group or two or more of hydrophobic groups in a molecule, and when there are two or more of hydrophobic groups, these may be the same or different. For example, in the case of hexylene glycol represented by the following formula (1), the structure of having a methyl group in a dotted frame falls under the structure of "having a branched hydrophobic group".

(Formula 1)

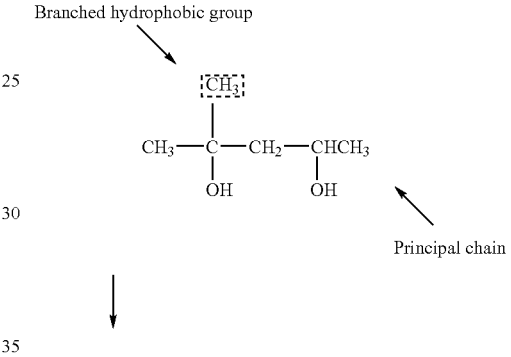

Among above mentioned water-soluble organic solvents, as alcohols having a branched hydrophobic group, for example, isobutanol, s-butanol, t-butanol (C4), isopentanol, s-pentanol, t-pentanol, 3-pentanol, 3-methyl-2-butanol, 2-methyl-1-butanol (C5), 2-ethylbutanol, 4-methyl-2-pentanol (C6) and the like can be cited. Further, as glycols and glycol ethers having a branched hydrophobic group, for example, 1,3-octylene glycol, hexylene glycol, dipropylene glycol, tripropylene glycol, polypropylene glycol, poly(oxyethylene-oxypropylene) derivative, ethylene glycol monoisopropyl ether, propylene glycol monobutyl ether, propylene glycol monoethyl ether, dipropylene glycol monobutyl ether, dipropylene glycol monopropyl ether, dipropylene glycol monoethyl ether, dipropylene glycol monomethyl ether and the like can be cited. Among these water-soluble organic solvents, in particular, dipropylene glycol alkyl ether can preferably be used.

Although the content amount of a water-soluble organic solvent can be decided depending on the kinds and the like of water-soluble organic solvents, usually it is about 1 to 50% by weight with respect to the amount of the ink composition of the present invention and preferably, 1 to 30% by weight. When the content amount of a water-soluble organic solvent exceeds 50% by weight, solubility of a water-soluble resin lowers and there is a concern for deposition. When the content amount of a water-soluble organic solvent is less than 1% by weight, sometimes satisfactory penetration and diffusion are not obtained.

(Others)

Regarding others, as required, a pH regulator, a protective colloid forming agent, pseudo-plasticity imparting agent, a rust inhibitor, an antiseptic mildew proofing agent and the like can be used by appropriately selecting them. As pH regulators, caustic soda, sodium carbonate, alkanol amine, ammonium and the like can be used. As protective colloid forming agents, alkali, amine, or alkanol amine salt of cross linking acrylic acid polymer are usable and to be specific, REOGIC 250 H, JUNRON PW 100 (manufactured by NIHON JUNYAKU CO., LTD), CARBOPOL #934 and #940 (manufactured by B. F. Goodrich Co., Ltd), PEMULEN, TR-1, TR-2(manufactured by B. F. Goodrich Co., Ltd), and the like are usable.

As pseudo-plasticity imparting agents which provide an ink with pseudo-plastic fluidity (thixotropic property), among general water-soluble polymers, natural polysaccharides and semi synthetic cellulose type polymers are usable. In more detailed explanation, as natural polysaccharides, guar gum, locust bean gum, welan gum, rhamsan gum, xanthane gum, and rheozan gum and the like (manufactured by Sansho Co., Ltd) having polymer chemical structure composed of monosaccharide such as glucose, galactose, rhamnose, mannose, gluglonic acid and the like are usable and as semi synthetic cellulose type polymer, methyl cellulose, ethyl cellulose, carboxy methyl cellulose and the like in which hydroxyl group of cellulose are esterified or etherified and then dissolved in water are usable.

As rust inhibitors, benzotriazole, and the derivatives thereof, dicyclohexyl ammonium nitrate are usable. As antiseptic mildew proofing agents, potassium sorbate, benzoic acid soda, sodium pentachlorophenyl, sodium dihydroacetic acid, 1,2-benzoisothiazolin 3-one and the like are usable.

(Application)

Above mentioned aqueous ink composition for ball-point pens can be used for ball-point pens. In particular, it can preferably be used for aqueous gel ink ball-point pens.

EXAMPLES

Next, the present invention is explained in detail by Examples. Examples 1 to 4 and Comparative Examples 1 to 4 relate to a ball-point pen with refilling type of feeding an ink directly in which an ink is directly filled (the same method as in oily ball-point pens) in an ink container molded by a polypropylene which was filled in a body container and at a rear end portion of an ink, making polybuthane a substrate, as required, a back flow prevention agent produced by gelatinizing using a gelling agent is filled and further, at an ink tip portion, a tip plug with a stainless ball-point pen tip fitted is connected.

Each aqueous ink composition was obtained by the following method with a composition and content amount (parts by weight) represented in Table 1. For information, regarding dispersing method, defoaming method, and filtering method, conventionally known methods were employed.

TABLE 1

| Composition | | Example ① | Example ② | Example ③ | Example ④ | Comparative Example ① | Comparative Example ② | Comparative Example ③ | Comparative Example ④ |
|---|---|---|---|---|---|---|---|---|---|
| Carbon black (PrintexG) | 1 | 7.00 | 7.00 | — | — | 7.00 | 7.00 | 7.00 | 7.00 |
| Red pigment(Shimurafast red4127) | 2 | — | — | 5.00 | 5.00 | — | — | — | — |
| Styreneacrylacid copolymer(dispersant) | 3 | 1.40 | 1.40 | 1.40 | 1.40 | 1.40 | 1.40 | 1.40 | 1.40 |
| Polyacrylic acid(thickening agent) | 4 | 0.24 | 0.24 | 0.24 | 0.24 | 0.24 | 0.24 | 0.24 | 0.24 |
| Xanthane gum(thickening agent) | 5 | 0.18 | 0.18 | 0.18 | 0.18 | 0.18 | 0.18 | 0.18 | 0.18 |
| ProxelXL-2(antiseptic agent) | 6 | 0.40 | 0.40 | 0.40 | 0.40 | 0.40 | 0.40 | 0.40 | 0.40 |
| PhosphanolML-220(lubricant) | 7 | 0.50 | 0.50 | 0.50 | 0.50 | — | 0.50 | — | 0.50 |
| NaOH(pH regulator) | 8 | 0.10 | 0.10 | 0.10 | 0.10 | 0.10 | 0.10 | 0.10 | 0.10 |
| DowanolDPM | 9 | 5.00 | — | 5.00 | — | — | — | 5.00 | — |
| DowanolDPNP | 10 | — | 5.00 | — | 5.00 | — | — | — | — |
| Propyleneglycol | 11 | — | — | — | — | — | — | — | 5.00 |
| Ion exchange water | 12 | 85.18 | 85.18 | 87.18 | 87.18 | 90.68 | 90.18 | 85.68 | 85.18 |
| Total | | 100.00 | 100.00 | 100.00 | 100.00 | 100.00 | 100.00 | 100.00 | 100.00 |
| Effect | | | | | | | | | |
| Discontinuing lines | | ○ | ○ | ○ | ○ | X | Δ | X | Δ |
| Handwriting performance | | ○ | ○ | ○ | ○ | X | ○ | X | ○ |

In the table, a composition of each material is as follows. The reference numbers correspond to those in the table.

(Colorant)

1 Carbon black: C.I. Pigment Black 7, trade name "Printex G" manufactured by Degussa Japan Co., Ltd.

2 Monoazo type red pigment: C.I. Pigment Red 258, trade name "Shimura Fast Red 4127" manufactured by DAINIPPON INK AND CHEMICALS INCORPORATED.

(Dispersant)

3 Styrene acrylic acid copolymer: trade name "JOHNCRYL 683" manufactured by Johnson Polymer Co., Ltd.

(Thickening Agent)

4 Cross linking polyacrylic acid: trade name "CARBOPOL 940" manufactured by B. F. Goodrich Co., Ltd.

5 Xanthane gum: trade name "KELZAN" manufactured by Sansho Co, Ltd.

(Antiseptic Mildew Proofing Agent)

6 1,2-benzoisothiazolin 3-one:trade name "PROXEL XL-2" manufactured by Zeneca Co., Ltd.

(Lubricant)

7 Compound represented by general formula (1): trade name "PHOSPHANOL ML-220" manufactured by TOHO Chemical Industry Co., Ltd.

(pH Regulator)

8 Sodium hydroxide: reagent (Water-Soluble Organic Solvent)

9 Dipropylene glycol monomethyl ether: trade name "DOWANOL DPM" manufactured by Dow Chemical Co., Ltd.

10 Dipropylene glycol n-propyl ether: trade name "DOW-ANOL DPM" manufactured by Dow Chemical Co., Ltd.
11 Propylene glycol: reagent Example 1

Among the above ingredients, at first, xanthane gum was added to 30 parts of water little by little so that any heterogeneity might not be generated and was completely stirred and dissolved, followed by adding carbon black, sodium salt of styrene acryl acid copolymer and 40.2 parts of water thereafter stirring and dispersing in one hour with a sand mill, and adding each of other ingredients and stirring and dissolving and stirring for one hour, further regulating pH to make it 9 with aqueous solution of sodium hydroxide followed by filtering, thereby obtaining a black colored ink composition.

Example 2

Among the above ingredients, at first, xanthane gum was added to 30 parts of water little by little so that any heterogeneity might not be generated and was completely stirred and dissolved, followed by adding carbon black, sodium salt of styrene acryl acid copolymer and 40.2 parts of water thereafter stirring and dispersing in one hour with a sand mill, and adding each of other ingredients and stirring and dissolving and stirring for one hour, further regulating pH to make it 9 with aqueous solution of sodium hydroxide followed by filtering, thereby obtaining a black colored ink composition.

Example 3

Among the above ingredients, at first, xanthane gum was added to 30 parts of water little by little so that any heterogeneity might not be generated and was completely stirred and dissolved, followed by adding red colored pigment, sodium salt of styrene acryl acid copolymer and 40.2 parts of water thereafter stirring and dispersing in one hour with a sand mill, and adding each of other ingredients and stirring and dissolving and stirring for one hour, further regulating pH to make it 9 with aqueous solution of sodium hydroxide followed by filtering, thereby obtaining a red colored ink composition.

Example 4

Among the above ingredients, at first, xanthane gum was added to 30 parts of water little by little so that any heterogeneity might not be generated and was completely stirred and dissolved, followed by adding red colored pigment, sodium salt of styrene acryl acid copolymer and 40.2 parts of water thereafter stirring and dispersing in one hour with a sand mill, and adding each of other ingredients and stirring and dissolving and stirring for one hour, further regulating pH to make it 9 with aqueous solution of sodium hydroxide followed by filtering, thereby obtaining a red colored ink composition.

Comparative Example 1

Compounds represented by general formula (1) in ink ingredients in Example 1 and water-soluble organic solvents of glycol ethers having a branched hydrophobic group was substituted by the same amount of water and a black colored ink composition was obtained by the same method.

Comparative Example 2

Water-soluble organic solvents of glycol ethers having a branched hydrophobic group in Example 1 was substituted by the same amount of water and a black colored ink composition was obtained by the same method.

Comparative Example 3

Compounds represented by general formula (1) in ink ingredients in Example 1 was substituted by the same amount of water and a black colored ink composition was obtained by the same method.

Comparative Example 4

Water-soluble organic solvents of glycol ethers having a branched hydrophobic group in Example 1 was substituted by the same amount of water-soluble organic solvents of glycol ethers having no branched hydrophobic group and a black colored ink composition was obtained by the same method.

Regarding these test samples, the following tests were conducted. These results were shown in Table 1.

(Writing Performance)

Using these test samples, writing was conducted by a spiral type writing test machine with a writing angle of 65°, a load of 100 g, and at a speed of 7 cm/sec on a writing pad A of JIS P3201 and a writing state of each ink composition was evaluated by visual observation. The criteria was based on the following standard; ○ for a written mark with no discontinuing lines, Δ for a certain discontinuing lines although not so remarkable, and X for generating remarkable discontinuing lines.

Also hand writing was conducted on a commercially available loose-leaf pad and the writing was evaluated. The criteria was based on the following standard; ○ for a smooth writing, Δ for hard pen writing, and X for having some resistance.

(Evaluation Result)

From Table 1, in an ink of Comparative Example 1 which did not include a compound represented by said general formula (1) and dipropylene glycol alkyl ether, remarkable discontinuing lines were generated and at the time of hand writing, some resistance was felt.

On the other hand, in inks of Examples 1 to 4 which included a compound represented by said general formula (1) and dipropylene glycol alkyl ether, no bleeding and discontinuing lines were generated in the writing test and smooth writing was obtained.

On the other hand, since inks of Comparative Examples 1 and 3 did not include lubricants, they were poor in lubricity and discontinuing lines were generated. In addition, although an ink of Comparative Example 2 including a compound represented by said general formula (1) and having no water soluble-organic solvent with branched hydrophobic group, compared with an ink of Comparative Example 1 had lubricity and had no remarkable discontinuing lines, since penetrating property by a water-soluble organic solvent lacked, there occurred some discontinuing lines. Further, although lubricity was secured in Comparative Example 4, since penetrating property by a water-soluble organic solvent lacked, there occurred some discontinuing lines.

INDUSTRIAL APPLICABILITY

Since the present invention relates to an ink comprising water and a colorant as essential ingredients and characterized by further comprising a compound represented by the above mentioned general formula (1) and at least one water-soluble organic solvent selected from among alcohols having branched hydrophobic groups, glycols, and glycol ethers, it is capable of maintaining lubricity and smooth writing performance which conventional ink compositions for ball-point pens have and moreover, the bleeding of a written mark and discontinued lines at a time of writing can be eliminated. In particular, by using a compound represented by said general formula (1) and at least one species of water-soluble organic solvents selected from among alcohols, glycols, and glycol ethers together, even when the amount of lubricant is reduced from the amount required for securing lubricity and preventing discontinuing lines in the case of using a compound represented by said general formula (1) alone, since lubricity can be secured and discontinuing lines can be prevented, there is an effect of preventing bleeding or ink leakage from a container for writing instruments caused by adding great amount of lubricants.

We claim:

1. An aqueous ink composition for ball-point pens, comprising water, a colorant, a water-soluble organic solvent and a compound represented by the following general formula (1) as essential ingredients, wherein said water soluble organic solvent is at least one selected from the group consisting of alcohol having branched hydrophobic group, glycol having branched hydrophobic group, or glycol ether having branched hydrophobic group

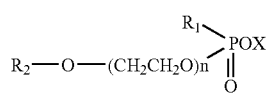

General formula (1)

($R_1$-is either —OX or $R_2$—O—$(CH_2CH_2O)_n$—, $R_2$-is alkyl group or alkenyl group or alkyl phenyl group of $C_8$ to $C_{18}$, n is 1 to 30, X is alkali metal or amine or alkanol amine).

2. An aqueous ink composition for ball-point pens as set forth in claim 1, wherein said colorant is a pigment.

3. An aqueous ink composition for ball-point pens as set forth in claim 1, wherein said water-soluble organic solvent is dipropylene glycol alkyl ether.

4. An aqueous ink composition for ball-point pens comprising water, a colorant, a compound represented by the following general formula (1) and a water-soluble organic solvent, wherein at least one alcohol having branched hydrophobic group is present as said water soluble organic solvent

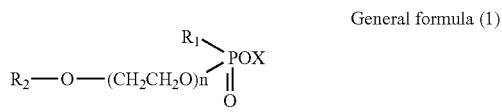

General formula (1)

($R_1$-is either —OX or $R_2$—O—$(CH_2CH_2O)_n$—, $R_2$-is alkyl group or alkenyl group or alkyl phenyl group of $C_8$ to $C_{18}$, n is 1 to 30, X is alkali metal or amine or alkanol amine).

5. An aqueous ink composition for ball-point pens comprising water, a colorant, a compound represented by the following general formula (1) and a water-soluble organic solvent wherein at least one glycol having branched hydrophobic group is present as said water soluble organic solvent

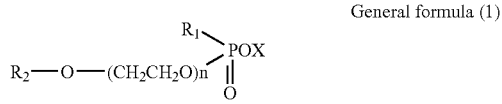

General formula (1)

($R_1$-is either —OX or $R_2$—O—$(CH_2CH_2O)_n$—, $R_2$-is alkyl group or alkenyl group or alkyl phenyl group of $C_8$ to $C_{18}$, n is 1 to 30, X is alkali metal or amine or alkanol amine).

6. An aqueous ink composition for ball-point pens according to claim 1, wherein the water-soluble organic solvent is present in an amount of about 1 to 50% by weight.

7. An aqueous ink composition for ball point pens according to claim 1, wherein the colorant is present in an amount of about 1 to 30% by weight.

8. An aqueous ink composition for ball-point pens according to claim 4, wherein the alcohol having branched hydrophobic group is at least one selected from the group consisting of isobutanol, t-butanol, isopentanol, t-pentanol, 3-methyl-2-butanol, 2-methyl-1-butanol, and 2-ethylbutanol.

9. An aqueous ink composition for ball-point pens according to claim 5, wherein the glycol having a branched hydrophobic group is at least one selected from the group consisting of 1, 3-octylene glycol, hexylene glycol, and tripropylene glycol.

10. A method of writing a mark, comprising applying the aqueous ink composition for ball-point pen according to claim 1 to a substrate with a ball-point pen.

11. In a ball-point pen containing an ink composition, the improvement wherein the aqueous ink composition for ball-point pen according to claim 1 is used as the ink composition.

* * * * *